(12) United States Patent
Benisch

(10) Patent No.: US 12,486,405 B2
(45) Date of Patent: Dec. 2, 2025

(54) PIGMENT AND PIGMENT PRODUCTION METHOD

(71) Applicant: Garrett Foster Benisch, Summit, NJ (US)

(72) Inventor: Garrett Foster Benisch, Summit, NJ (US)

( * ) Notice: Subject to any disclaimer, the term of this patent is extended or adjusted under 35 U.S.C. 154(b) by 832 days.

(21) Appl. No.: 16/854,540

(22) Filed: Apr. 21, 2020

(65) Prior Publication Data

US 2020/0339818 A1    Oct. 29, 2020

Related U.S. Application Data

(60) Provisional application No. 62/838,475, filed on Apr. 25, 2019.

(51) Int. Cl.
| C09C 1/48 | (2006.01) |
| B27K 3/16 | (2006.01) |

(Continued)

(52) U.S. Cl.
CPC .................. *C09C 1/48* (2013.01); *B27K 3/16* (2013.01); *B27K 3/52* (2013.01); *C09D 11/033* (2013.01);

(Continued)

(58) Field of Classification Search
CPC .......... C02F 11/00; C02F 11/02; C02F 11/04; C02F 11/10; C02F 11/13; C02F 3/00; C02F 3/28; C09C 1/00; C09C 1/44; C09C 1/48; C09C 1/482; C09D 11/00; C09D 11/033; C09D 11/037; C09D 17/00; C09D 17/002;

(Continued)

(56) References Cited

U.S. PATENT DOCUMENTS

| 3,962,044 A | 6/1976 | Mackenzie |
| 8,518,219 B2 | 8/2013 | Plopski et al. |

(Continued)

FOREIGN PATENT DOCUMENTS

| CN | 104479448 A |   | 4/2015 |
| CN | 104671628 A | * | 6/2015 |

(Continued)

OTHER PUBLICATIONS

Silvana, "Making Your Own Inks and Pigments", last revised 2005, The Society for Creative Anachronism, p. 1-2 (Year: 2005).*

(Continued)

*Primary Examiner* — Amber R Orlando
*Assistant Examiner* — Jeffrey Eugene Barzach
(74) *Attorney, Agent, or Firm* — Gearhart Law LLC

(57) ABSTRACT

A novel pigment and a method to create the novel pigment are described. A raw material, such as municipal sewage sludge, municipal compost, food waste, agricultural waste, forestry waste, agroforestry waste, biomass, and/or livestock waste, are screened, cleaned, and/or prepared. The raw material is digested by microorganisms to create methane and a biosolid. The biosolid is dried and then carbonized to create a biochar. The biochar is ground into a powder pigment until a predetermined particle size is reached. The powder pigment having the predetermined particle size is applied to a media to create at least one product, such as an ink, a paint, a stain, a colored material, and/or a dye.

1 Claim, 16 Drawing Sheets

(51) Int. Cl.
| | |
|---|---|
| *B27K 3/52* | (2006.01) |
| *C09D 11/00* | (2014.01) |
| *C09D 11/033* | (2014.01) |
| *C09D 11/037* | (2014.01) |
| *C09D 15/00* | (2006.01) |
| *C09D 17/00* | (2006.01) |
| *C12P 5/02* | (2006.01) |

(52) U.S. Cl.
CPC ............ *C09D 11/037* (2013.01); *C09D 15/00* (2013.01); *C09D 17/002* (2013.01); *C09D 17/005* (2013.01); *C12P 5/023* (2013.01); *C09D 11/00* (2013.01)

(58) Field of Classification Search
CPC ...... C09D 17/005; C09D 15/00; C01B 49/00; Y02W 10/40; F23G 5/00; F23G 5/027
See application file for complete search history.

(56) References Cited

U.S. PATENT DOCUMENTS

| | | | |
|---|---|---|---|
| 8,623,227 B2 | 1/2014 | Lin et al. | |
| 2009/0098292 A1* | 4/2009 | Tyrell | C09C 1/48 427/256 |
| 2010/0147186 A1* | 6/2010 | Haugen | C09D 5/1625 106/18.32 |
| 2010/0314241 A1 | 12/2010 | Plopski et al. | |
| 2013/0341175 A1 | 12/2013 | Linden et al. | |
| 2014/0275387 A1* | 9/2014 | Bushhouse | D21H 19/38 524/425 |
| 2016/0230193 A1* | 8/2016 | Josse | C12P 5/023 |
| 2018/0281444 A1* | 10/2018 | Wada | B41J 2/16523 |
| 2018/0362791 A1* | 12/2018 | Nio | B41J 2/01 |
| 2020/0140692 A1* | 5/2020 | Albers | C09C 1/48 |

FOREIGN PATENT DOCUMENTS

| | | | | |
|---|---|---|---|---|
| CN | 108911453 A | * | 11/2018 | ............. C02F 11/18 |
| KR | 20150096349 A | * | 8/2015 | |
| KR | 20160093290 A | * | 8/2016 | |

OTHER PUBLICATIONS

English machine translation of CN108911453A ("Machine_Translation_Peng_CN108911453") (Year: 2018).*

Cao, Yucheng, and Artur Pawlowski. "Sewage sludge-to-energy approaches based on anaerobic digestion and pyrolysis: Brief overview and energy efficiency assessment." Renewable and Sustainable Energy Reviews, vol. 16, No. 3, Apr. 2012, pp. 1657-1665, https://doi.org/10.1016/j.rser.2011.12.014. (Year: 2012).*

Hulse, Vanessa, "Biochar as a Substitute for Carbon Black in Lithographic Ink Production" (2019). Thesis. Rochester Institute of Technology. Accessed from https://repository.rit.edu/theses/10130 (Year: 2019).*

Opatokun, Suraj Adebayo, et al. "Life Cycle Analysis of energy production from food waste through anaerobic digestion, pyrolysis and Integrated Energy System." Sustainability, vol. 9, No. 10, Oct. 5, 2017, p. 1804, https://doi.org/10.3390/su9101804. (Year: 2017).*

Silvana, "Making Your Own Inks and Pigments", last revised 2005, The Society for Creative Anachronism, p. 1-2 (Year: 2005) (Year: 2005).*

Edwards, Howell G. "Chapter 1. Analytical Raman spectroscopy of Inks." Raman Spectroscopy in Archaeology and Art History, 2018, pp. 1-15, https://doi.org/10.1039/9781788013475-00001. (Year: 2018).*

"How to Make Natural Pigments from Foraged Raw Resources." Lost in Colours, Apr. 14, 2020, www.lostincolours.com/foraging-for-pigments-from-local-rocks/. (Year: 2020).*

Rojas, Dan. "Biomass Char Solar Fresnel Lens Pyrolysis Green Garbage Disposal Bio Char." YouTube, YouTube, 14 Sep. 2008, www.youtube.com/watch?v=iys379_2CTg. (Year: 2008).*

Hu, Xun, and Mortaza Gholizadeh. "Biomass pyrolysis: A review of the process development and challenges from initial researches up to the commercialisation stage." Journal of Energy Chemistry, vol. 39, Feb. 5, 2019, pp. 109-143, https://doi.org/10.1016/j.jechem.2019.01.024. (Year: 2019).*

Caballero, J.A., et al. "Characterization of sewage sludges by primary and secondary pyrolysis." Journal of Analytical and Applied Pyrolysis, vol. 40-41, May 1997, pp. 433-450, https://doi.org/10.1016/s0165-2370(97)00045-4. (Year: 1997).*

RIT Digital Institutional Repository. "Biochar as a Substitute for Carbon Black in Lithographic Ink Production." RIT Digital Institutional Repository, Apr. 24, 2019, repository.rit.edu/theses/10130/. (Year: 2019).*

English machine translation of KR20150096349A (Year: 2015).*

English machine translation of CN104671628A (Year: 2015).*

Yao, Zhiyi, et al. "Anaerobic digestion and gasification hybrid system for potential energy recovery from yard waste and woody biomass." Energy, vol. 124, Apr. 2017, pp. 133-145, https://doi.org/10.1016/j.energy.2017.02.035 (Year: 2017).*

Sears, Rodney E. "Gasification of Lignite Using Solar Energy" (1983). Theses and Dissertations. 6137. https://commons.und.edu/theses/6137 (Year: 1983).*

Sahitya, Sumit, et al. "Hydrogen-rich syngas from jatropha curcas shell biomass char in Fresnel lens solar concentrator assembly." Energy Fuels, vol. 31, No. 8, Jul. 31, 2017, pp. 8335-8347, https://doi.org/10.1021/acs.energyfuels.7b01406. (Year: 2017).*

"Carbon Black." Pigments through the Ages , Feb. 16, 2010, www.webexhibits.org/pigments/indiv/recipe/carbonblack.html. (Year: 2010).*

English machine translation of KR-20160093290-A (Year: 2016).*

Lacroix, Nicolas, et al. "Anaerobic digestion and gasification coupling for wastewater sludge treatment and recovery." Waste Management Research: The Journal for a Sustainable Circular Economy, vol. 32, No. 7, Jun. 27, 2014, pp. 608-613, https://doi.org/10.1177/0734242x14538308 (Year: 2014).*

Liao, Wenxi, and Sean C. Thomas. "Biochar particle size and post-pyrolysis mechanical processing affect soil ph, water retention capacity, and Plant Performance." Soil Systems, vol. 3, No. 1, Feb. 14, 2019, p. 14, https://doi.org/10.3390/soilsystems3010014 (Year: 2019).*

Weldekidan, Haftom, et al. "Review of solar energy for biofuel extraction." Renewable and Sustainable Energy Reviews, vol. 88, May 2018, pp. 184-192, https://doi.org/10.1016/j.rser.2018.02.027 (Year: 2018).*

English machine translation of CN-108911453-A (Year: 2018).*

* cited by examiner

122

122

134

134

PIGMENT AND PIGMENT PRODUCTION METHOD

CROSS-REFERENCE TO RELATED APPLICATION

This application is a U.S. Non-Provisional Patent Application that claims priority from U.S. Provisional Patent Application No. 62/838,475, filed on Apr. 25, 2019, the contents of which are hereby fully incorporated by reference.

FIELD OF THE EMBODIMENTS

The field of the invention and its embodiments relate to a novel pigment and methods for creating the novel pigment. In particular, the present invention is directed to the novel pigment and the methods for creating the novel pigment from raw materials, such as municipal sewage sludge, municipal compost, food waste, agricultural waste, forestry waste, agroforestry waste, biomass, and/or livestock waste.

BACKGROUND OF THE EMBODIMENTS

Waste, such as sewage sludge, is a residual, semi-solid material that is produced as a by-product during sewage treatment of industrial or municipal wastewater. Sewage sludge solids comprise a mixture of organic and inorganic materials. The organic materials include crude proteins, lipids, and carbohydrates and the inorganic materials include silt, grit, clay, and heavy metals. Typical raw sewage sludge comprises about 60-80% volatile material and about 25-40% organic carbon. Disposal of the sludge is expensive and normally constitutes up to 50% of the total annual costs of wastewater treatment. Sludge disposal options currently include agricultural utilization, land-filling, and incineration.

Numerous sludge processing options have been proposed and have the potential to convert a fraction of organic material into usable energy. Such sludge processing options include: anaerobic digestion, air incineration, gasification, and liquefaction. Others have contemplated reuse of such sewage solids after sewage sludge treatment. Biosolids are nutrient-rich organic materials that can be reused after stabilization processes, such as anaerobic digestion and composting. Every day, New York City landfills approximately 2.8 million pounds of the biosolids. Thus, a need exists for additional methods to use these biosolids, rather than disposing of them.

Ink is a liquid or paste that contains pigments or dyes and is used to color a surface to produce an image, text, or design. In plastics, paints, and inks, carbon black is used as a color pigment. Since carbon black and other black pigments are often derived from sources that rely on fossil fuels or are unsustainable in and of themselves, a need also exists for a method to carbonize these biosolids to create a biochar useful in numerous products, such as inks, where such method occurs without substantial energy loss.

REVIEW OF RELATED TECHNOLOGY

U.S. Pat. No. 3,962,044 A is directed to a method of treating solid dry animal excreta to provide useful products therefrom. The method includes: particulating the solid dry animal excreta to a mesh of about 5-50; heating the dry particulate excreta in a closed heating zone by a heating means to a temperature within a treating range of about 300° C. to about 600° C.; maintaining the dry particulate excreta in the heating zone within the range for about 15 minutes to about 120 minutes sufficient to volatilize a portion of the excreta and partially carbonize the resultant solid residue; separating and recovering the volatilized portion by condensation of condensibles and separation of water therefrom; and cooling the residue and recovering the same.

CN 104479448 A relates to a method for producing black printing ink by recycling energy. According to the method, dyed wastewater discharged during the production of red, yellow or blue based ink is degreased and used as a wetting agent for carbon black. The purified degreased wastewater is then discharged to a sewage plant for treatment.

U.S. Pat. No. 8,623,277 B2 describes a flamer used to sterilize poultry litter, soil, concrete, etc. The stationary or mobile flamer disclosed comprises a hood to contain the heat, an external frame, and burners. A fuel tank may be carried on the flamer or on a tractor. An additional embodiment provides for mounting the flamer on wheels, permitting the unit to be towed by a truck, four-wheeler, tractor, etc. The burners are adjustable as to angle and fueling rate. A pressure in the fuel system is controlled by selectively switching between the liquid and vaporous components of the fuel. By limiting how low the pressure may fall, the flow of fuel from the tank to the torches is more consistent.

U.S. Published Patent Application No. 2013/0341175 A1 describes an improved solar biochar reactor system. The system provides sufficient solar energy to a biochar reactor to convert animal waste or other biomass to biochar in a relatively cost-effective manner.

U.S. Pat. No. 8,518,219 B2 describes multistage processing of sewage sludge into synthetic fuel and chemical products by means of a direct thermo-chemical liquefaction process.

U.S. Published Patent Application No. 2010/0314241 A1 describes a multi-stage process for the treatment of organic waste. The process includes: (a) drying sewage sludge waste to reduce a water content of the sewage sludge waste to below about 15% so as to result in dried sewage sludge; (b) mixing the dried sewage sludge with a first solvent medium so as to result in a slurry; (c) subjecting the slurry to a thermo-chemical liquefaction process in the presence of a second solvent medium at a temperature ranging from about 275° C. to about 375° C. and a pressure of up to about 10 atmospheres so as to result in a first slurry product comprising a gaseous product, a liquid product and a solid product; (d) separating the first slurry product into a second slurry product and a condensable gas, where the condensable gas comprises water and other liquid fractions boiling out at up to about 250° C.; (e) steam stripping the second slurry product at a temperature ranging from about 250° C. up to about 400° C., separating therefrom liquid products from solid residue so as to result in mix vapors and solid char; (f) cooling and separating the mix vapors so as to obtain two separate streams of an oil product and water; and (g) subjecting the oil product to vacuum distillation so as to recover oil fractions having a boiling temperature between about 250° C. to about 350° C. and oil fractions having a boiling temperature above about 350° C.

Various pigments and methods to generate the pigments exist in the art. However, their properties and means of operation are substantially different from the present disclosure, as the other inventions fail to solve all the problems taught by the present disclosure.

SUMMARY OF THE EMBODIMENTS

The present invention and its embodiments relate to a novel pigment and methods for creating the novel pigment.

In particular, the present invention is directed to the novel pigment and the methods for creating the novel pigment from raw materials, such as municipal sewage sludge, municipal compost, food waste, agricultural waste, forestry waste, agroforestry waste, biomass, and/or livestock waste.

A first embodiment of the present invention describes a method to create a pigment from a raw material. The raw material is first screened, cleaned, and/or prepared. The raw material may include: municipal sewage sludge, municipal compost, food waste, agricultural waste, forestry waste, agroforestry waste, biomass, and/or livestock waste, among others. The raw material is then digested by microorganisms to create methane and a biosolid. In examples, the microorganisms are methanogens. Moreover, in some examples, the biosolid is a processed sewage. However, the microorganisms and the biosolid are not limited to these examples explicitly listed herein.

The biosolid is then dried. The method of drying the biosolid is not limited and numerous methods are contemplated. The dried biosolid is carbonized to create a biochar. In examples, the dried biosolid is carbonized via pyrolysis or gasification. The biochar is black in color. The biochar is then ground into a powder pigment until a predetermined particle size is reached. The methods to grind the biochar into the powder pigment are not limited and numerous methods are contemplated. The powder pigment having the predetermined particle size is then sifted.

The powder pigment having the predetermined particle size may then be applied to a media to create at least one product. The at least one product is an ink, a paint, a stain (e.g., a wood stain), a colored material, or a dye, among others. In an example, the at least one product is the ink and the media is a gum arabic. In another example, the at least one product is the stain (e.g., the wood stain) and the media is a linseed oil. In further examples, the ink may be applied to a wood product.

A second embodiment of the present invention describes a method to carbonize a biosolid to create a biochar. The method includes placing the biosolid in a metal container and closing the metal container comprising the biosolid. Heat is then applied to the closed container to carbonize the biosolid to create the biochar. The carbonization of the biosolid neutralizes a smell of the biosolid and renders the biosolid safe to handle.

In a first example, the heat comprises light (such as solar radiation) directed at the closed container through a lens (such as a fresnel lens). In a second example, the heat comprises a fire and the method further includes placing the closed container comprising the biosolid into a fire to carbonize the biosolid to create the biochar.

In general, the present invention succeeds in conferring the following benefits and objectives.

It is an object of the present invention to provide a novel pigment from a raw material.

It is an object of the present invention to provide a novel pigment from a raw material, such as municipal sewage sludge, municipal compost, food waste, agricultural waste, forestry waste, agroforestry waste, biomass, and/or livestock waste.

It is an object of the present invention to provide a method to generate the novel pigment without substantial energy loss.

DESCRIPTION OF THE PREFERRED EMBODIMENTS

Figure 1:
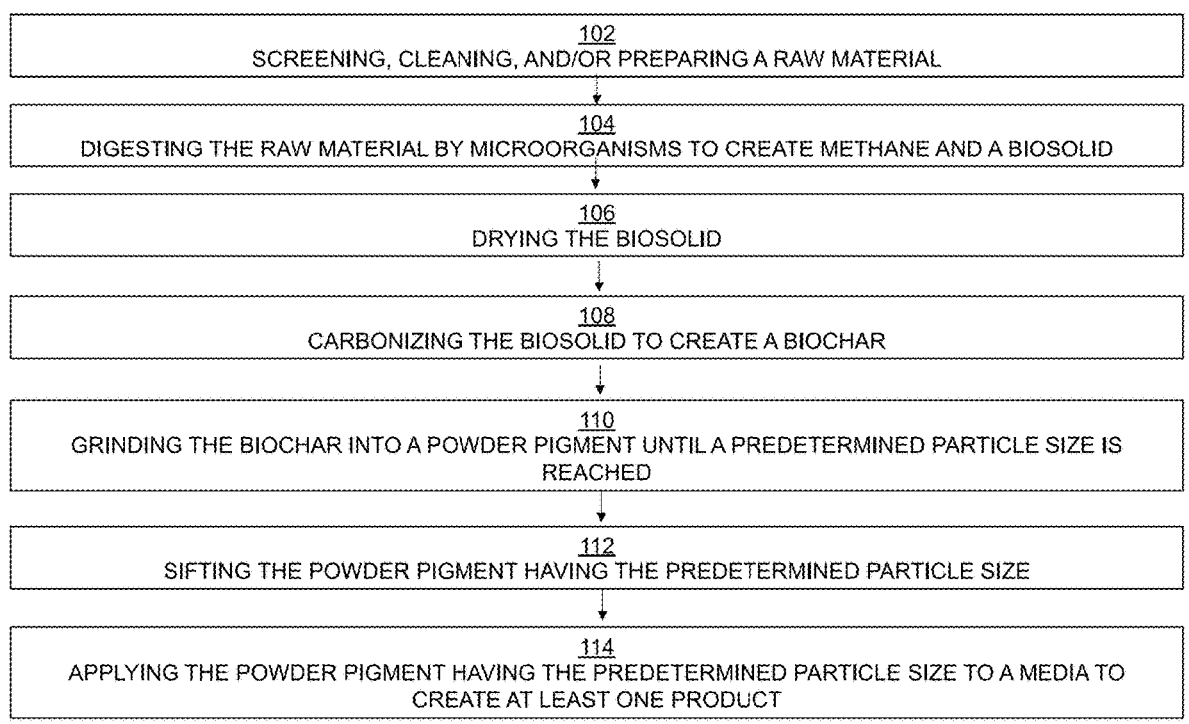
FIG. 1 depicts a block diagram of a method to create a pigment from a raw material, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As described herein, a "biosolid" or a digestate is the result of digesting a material anaerobically. In some examples, the biosolid may specifically refer to treated sewage sludges.

As described herein, a "biochar" is a stable solid charcoal that includes carbon.

As described herein, "methanogens" are microorganisms that produce methane as a metabolic byproduct in hypoxic conditions. Methanogens are a phylogenetically diverse group of strictly anaerobic organisms within the phylum Euryarchaeota.

As described herein, "gasification" refers to a process that converts organic-based or fossil fuel-based carbonaceous materials into carbon monoxide, hydrogen, and carbon dioxide. This is achieved by reacting the material at high temperatures (>700° C.), without combustion, with a controlled amount of oxygen and/or steam. The resulting gas mixture is a syngas (or "synthesis gas") or a producer gas and is itself a fuel. The power derived from gasification and combustion of the resultant gas is considered to be a source of renewable energy if the gasified compounds were obtained from biomass.

As described herein, "pyrolysis" refers to a thermal decomposition of materials at elevated temperatures in an inert atmosphere. Pyrolysis involves a change of chemical composition and is most commonly used in the treatment of organic materials. In general, pyrolysis of organic substances produces volatile products and leaves a solid residue enriched in carbon char. The pyrolysis (or devolatilization) process occurs at around 200-300° C.

As described herein, "gum arabic" refers to a gum exuded by some kinds of acacia, used in the food industry, in glue, as the binder for watercolor paints, and in incense.

As described herein, a "linseed oil" also refers to a flaxseed oil or a flax oil, which is an oil obtained from the dried, ripened seeds of the flax plant. The oil is obtained by pressing and sometimes followed by solvent extraction.

Figure 2:
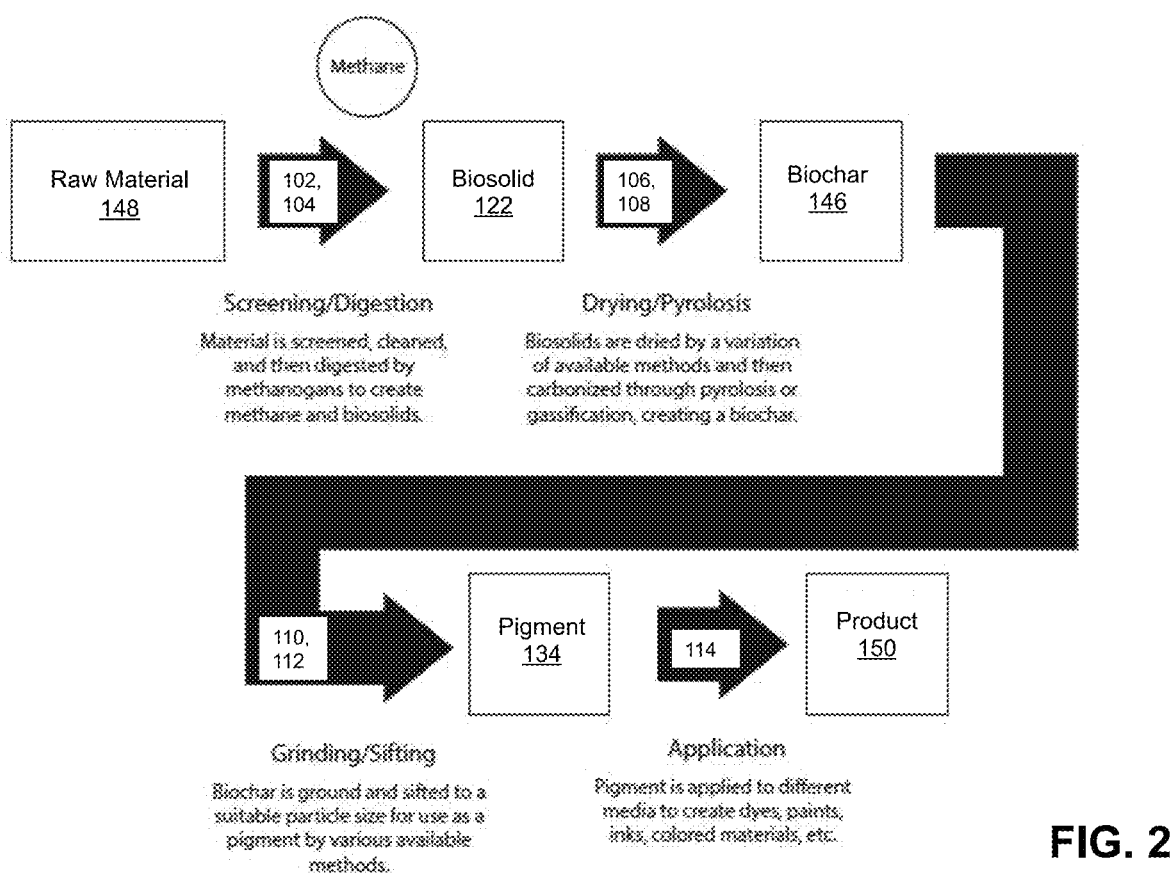
FIG. 2 depicts a schematic diagram of a method to create a pigment from a raw material, in accordance with embodiments of the present invention.

A method to create a pigment from a raw material is depicted in at least FIG. 1 and FIG. 2. As shown in FIG. 1, the method to create the pigment from the raw material begins at a process step 102, which includes screening, cleaning, and/or preparing a raw material 148. The raw material 148 may include: municipal sewage sludge, municipal compost, food waste, agricultural waste, forestry waste, agroforestry waste, biomass, and/or livestock waste, among other examples not explicitly listed herein.

Figure 3:
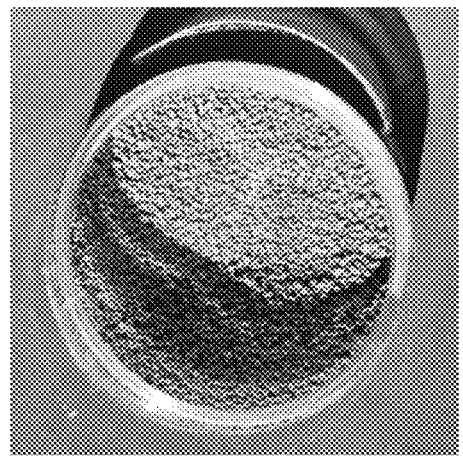
FIG. 3 depicts a perspective view of a biosolid that is un-carbonized and is located in a container, in accordance with embodiments of the present invention.
Figure 4:
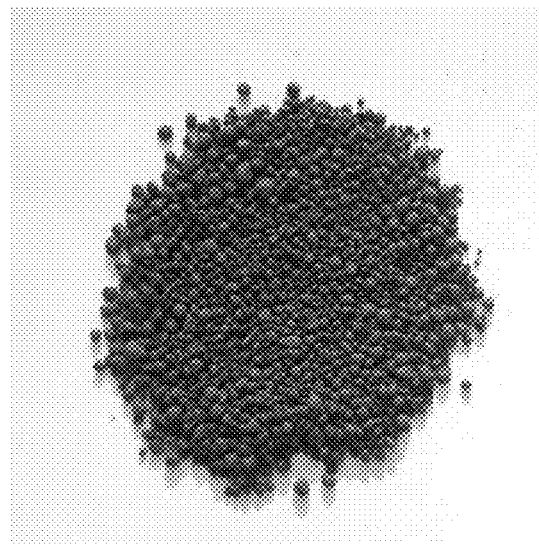
FIG. 4 depicts another perspective view of a biosolid that is un-carbonized and is located in a container, in accordance with embodiments of the present invention.

The process step 102 is followed by a process step 104, that includes digesting the raw material 148 by microorganisms to create methane and a biosolid 122. In examples, the microorganisms are methanogens. Moreover, in some examples, the biosolid 122 is a processed sewage. Perspective views of the un-carbonized biosolid 122 are depicted in at least FIG. 3 and FIG. 4.

The process step 104 is followed by a process step 106 that includes drying the biosolid 122. The process step 106 may occur via any conventional methods or means. The process step 106 is followed by a process step 108 that includes carbonizing the biosolid 122 to create a biochar 146. In examples, the biosolid 122 is carbonized via pyrolysis or gasification. The biochar 146 is black in color. The process step 108 is described further in FIG. 5, FIG. 6, and FIG. 8.

Figure 11:
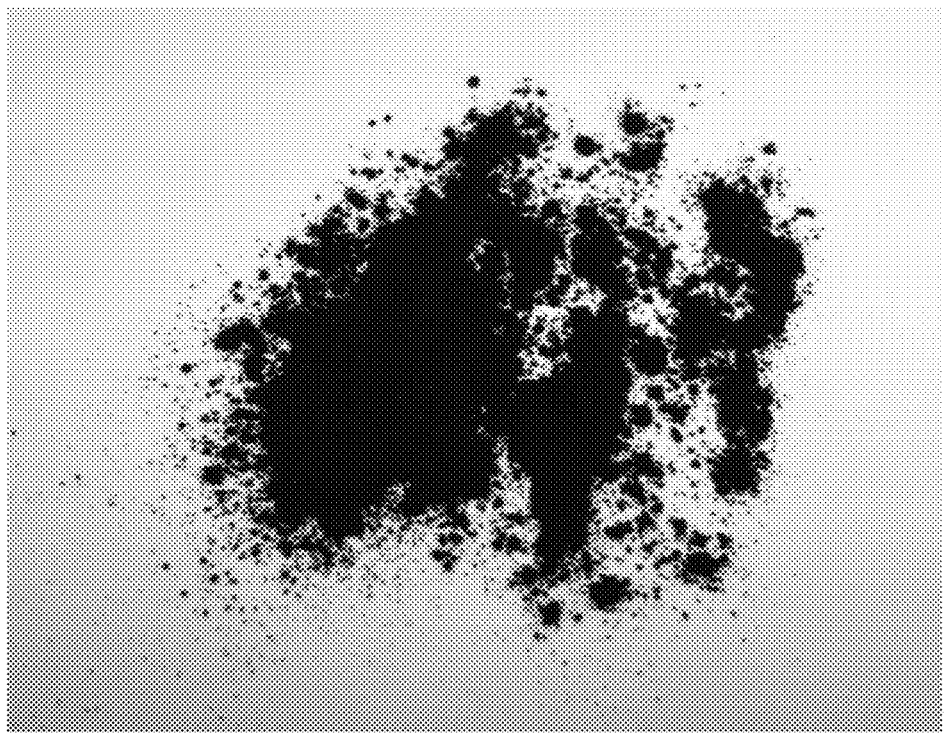
FIG. 11 depicts a perspective view of a biochar ground into a powder pigment, in accordance with embodiments of the present invention.
Figure 12:
FIG. 12 depicts another perspective view of a biochar ground into a powder pigment, in accordance with embodiments of the present invention.

The process step 108 may be followed by a process step 110 that includes grinding the biochar 146 into a powder pigment 134 until a predetermined particle size is reached. The process step 110 may occur via any conventional means or methods. The powder pigment 134 is depicted at least in FIG. 11 and FIG. 12. The process step 110 may be followed by a process step 112 that includes sifting the powder pigment 134 having the predetermined particle size. The process step 112 may be followed by a process step 114 that includes applying the powder pigment 134 having the predetermined particle size to a media to create at least one product 150. The at least one product 150 is an ink 136, a paint, a stain (e.g., a wood stain 152), a colored material, or a dye, among other examples not explicitly listed herein. In some examples, the ink 136 may be a letterpress ink 154.

Figure 13:
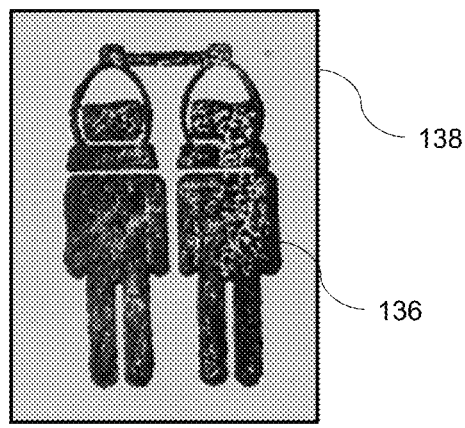
FIG. 13 depicts a perspective view of a powder pigment suspended in a media (e.g., a gum arabic media) for use as an ink, the ink being usable with a stamp to create at least one product, in accordance with embodiments of the present invention.
Figure 14:
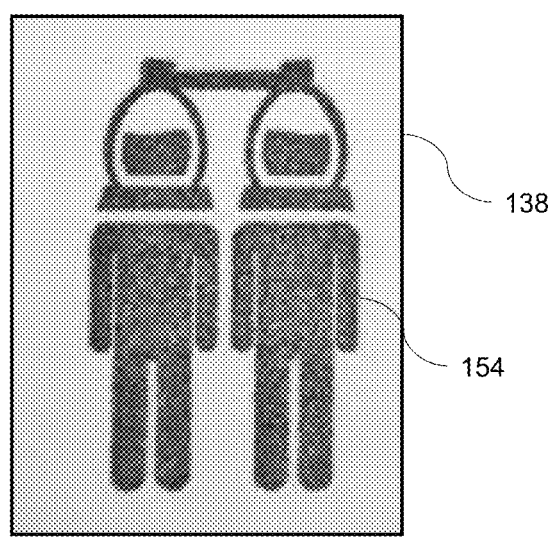
FIG. 14 depicts a perspective view of a powder pigment suspended in a media (e.g., a letterpress ink media) for use as a letterpress ink in creating at least one product, in accordance with embodiments of the present invention.
Figure 15:
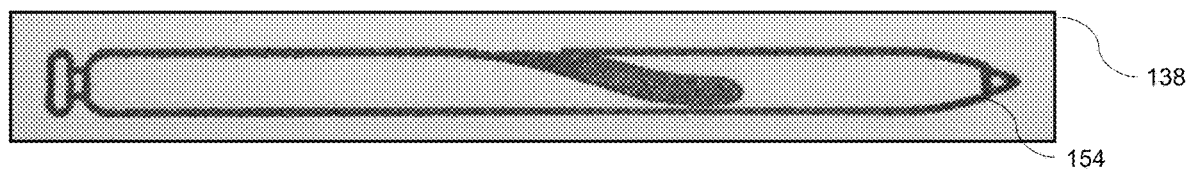
FIG. 15 depicts another perspective view of a powder pigment suspended in a media (e.g., a letterpress ink media) for use as a letterpress ink in creating at least one product, in accordance with embodiments of the present invention.
Figure 16:
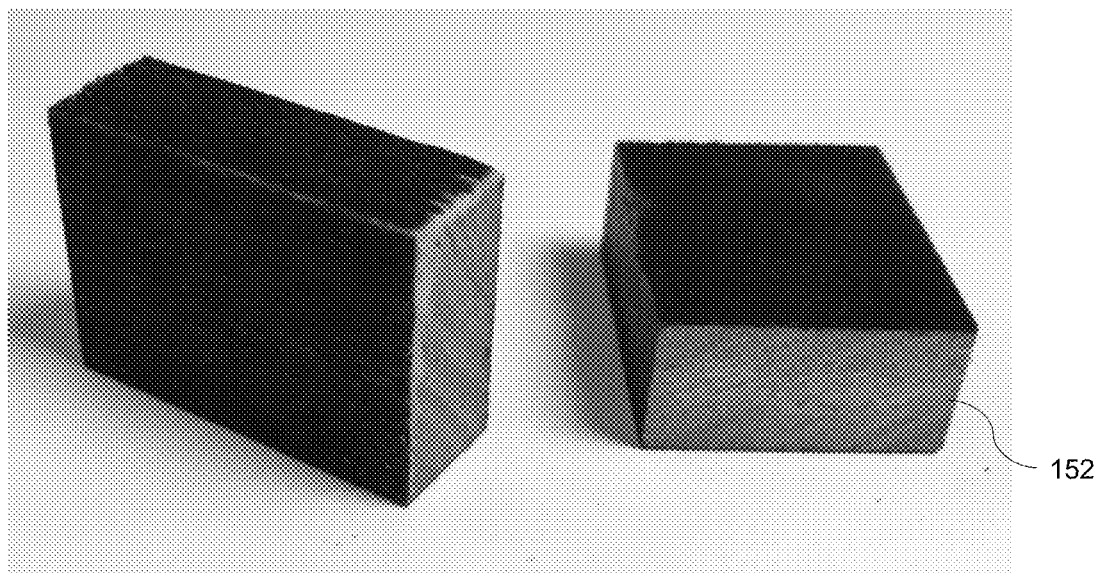
FIG. 16 depicts a perspective view of a powder pigment suspended in a media (e.g., a linseed oil media) for use as a wood stain in creating at least one product, in accordance with embodiments of the present invention.

In a first example and as depicted in FIG. 13, the at least one product 150 is the ink 136 and the media is a gum arabic. As an illustrative example, the ink 136 may be applied to a stamp to transfer the ink 136 to a wood product, such as a paper 138. In a second example and as depicted in FIG. 14 and FIG. 15, the at least one product 150 is the letterpress ink 154 and the media is a letterpress ink media (e.g., a rubber-based letterpress media). As an illustrative example, the letterpress ink 154 may be used in letterpress printing to transfer the letterpress ink 154 to the wood product, such as the paper 138. In third example and as depicted in FIG. 16, the at least one product 150 is the wood stain 152 and the media is a linseed oil. As an illustrative example, the wood stain 152 may be applied to wood 156.

Figure 5:
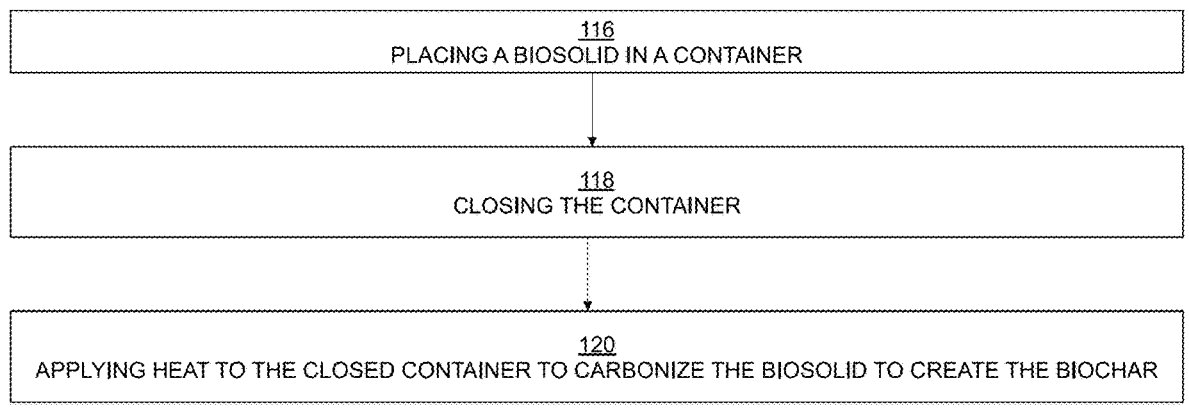
FIG. 5 depicts a block diagram of a method to carbonize a biosolid to create a biochar, in accordance with embodiments of the present invention.
Figure 9:
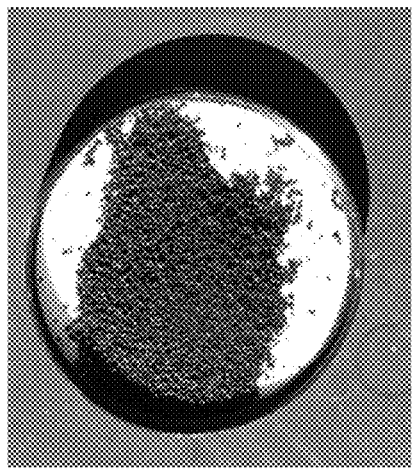
FIG. 9 depicts a perspective view of a carbonized biosolid located in a container, in accordance with embodiments of the present invention.
Figure 10:
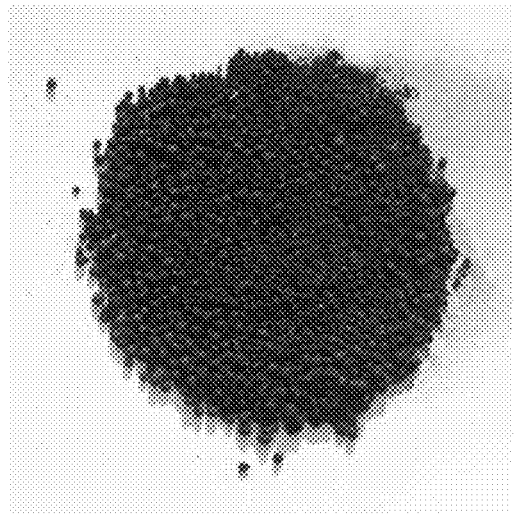
FIG. 10 depicts another perspective view of a carbonized biosolid located in a container, in accordance with embodiments of the present invention.

A method to carbonize a biosolid 122 to create the biochar 146 is depicted in FIG. 5. The method of FIG. 5 includes numerous process steps and may begin at a process step 116 that includes placing the biosolid 122 into a container 128. The container 128 may comprise a metal material. The process step 116 may be followed by a process step 118 that includes closing the container 128. The process step 118 may be followed by a process step 120 that may include applying heat to the container 128 in a closed position, the container 128 comprising the biosolid 122, to carbonize the biosolid 122 to create the biochar 146. It should be appreciated that the carbonization of the biosolid 122 neutralizes a smell of the biosolid 122 and renders the biosolid 122 safe to handle. Perspective views of the carbonized biosolid 122 are depicted in FIG. 9 and FIG. 10.

Figure 6:
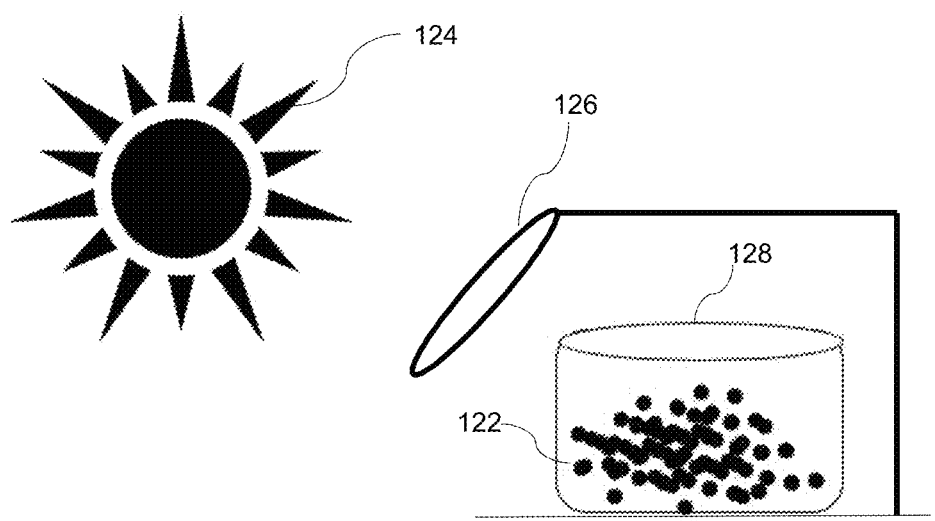
FIG. 6 depicts a schematic diagram of a first method to carbonize a biosolid to create a biochar, in accordance with embodiments of the present invention.
Figure 7:
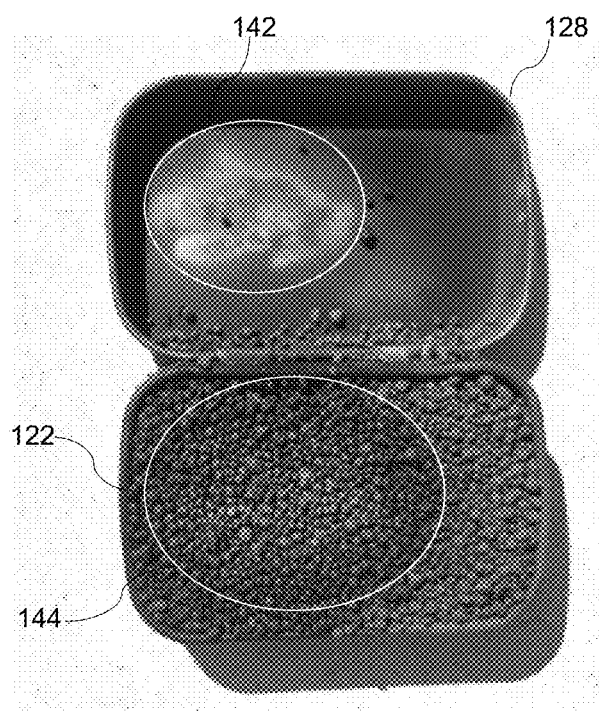
FIG. 7 depicts a perspective view of a partially carbonized biosolid located in a container, in accordance with embodiments of the present invention.

In a first example and as depicted in FIG. 6, the heat comprises light (such as solar radiation 124) directed at the container 128 in the closed position through a lens 126 (such as a fresnel lens). FIG. 7 depicts a partially carbonized biosolid 122 located in the container 128. A first circle 142 is located on a portion of an interior lid of the container 128. A second circle 144 located on an area of the biosolid 122. The first circle 142 depicts markings resulting from the solar radiation 124 directed at the container 128 in the closed position through the lens 126. The second circle 144 depicts a location where the heat was transferred to the biosolid 122 to result in a carbonization of the biosolid 122.

Figure 8:
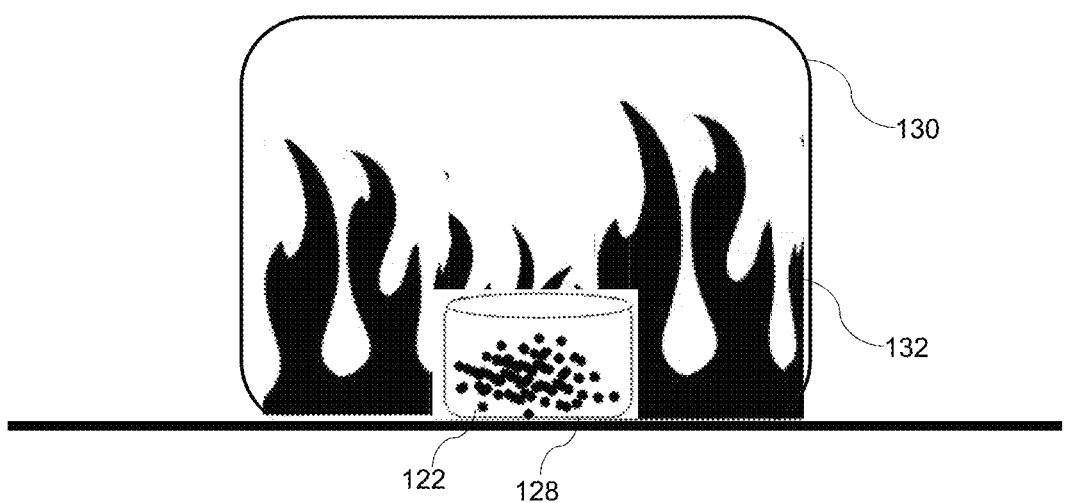
FIG. 8 depicts a schematic diagram of a second method to carbonize a biosolid to create a biochar, in accordance with embodiments of the present invention.

In a second example and as depicted in FIG. 8, the heat comprises a fire 132. As depicted in FIG. 8, the method further includes placing the container 128 in the closed position, the container 128 comprising the biosolid 122, into another container 130. The other container 130 is larger than the container 128 housing the biosolid 122. The fire 132 is located in the other container 130 such that the container 128 heats up, but does not allow oxygen into the container 128, which results in the carbonization of the biosolid 122, rather than combustion of the biosolid 122.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method to create a pigment from a raw material, the method consisting of:
    obtaining a dry biosolid from the raw material,
        wherein the raw material consists of municipal sewage sludge;
    carbonizing the dry biosolid using a heat source to heat a container containing the dry biosolid to create a biochar; and
    reducing the size of the biochar until a predetermined particle size is reached to form a powder pigment,
    wherein the carbonization of the dry biosolid to create the biochar occurs via gasification.

* * * * *